United States Patent [19]

Boone

[11] 4,061,302

[45] Dec. 6, 1977

[54] MOUNT

[76] Inventor: Terry Boone, 1343 N. Peach Ave., Fresno, Calif. 93727

[21] Appl. No.: 739,529

[22] Filed: Nov. 5, 1976

[51] Int. Cl.² .................................................. F16M 11/38
[52] U.S. Cl. .................................... 248/170; 248/188.6
[58] Field of Search ............... 248/528, 166, 434, 435, 248/168, 169, 170, 171, 188.6

[56] References Cited

U.S. PATENT DOCUMENTS

| 496,851 | 5/1893 | Bunker et al. | 248/170 |
| 798,371 | 8/1905 | Ward | 248/168 X |
| 1,235,388 | 7/1917 | Sherwood | 248/170 X |
| 2,347,443 | 4/1944 | Vesely | 248/170 X |
| 2,579,348 | 12/1951 | Taylor | 248/168 X |
| 2,670,163 | 2/1954 | Armitage | 248/528 X |
| 3,058,707 | 10/1962 | Lego | 248/528 X |

FOREIGN PATENT DOCUMENTS

| 538,620 | 6/1955 | Belgium | 248/170 |
| 417,999 | 11/1910 | France | 248/168 |
| 1,147,627 | 6/1957 | France | 248/166 |
| 318,479 | 1/1957 | Switzerland | 248/170 |

Primary Examiner—Lawrence J. Staab
Attorney, Agent, or Firm—Huebner & Worrel

[57] ABSTRACT

An improved mount characterized by an elongated pedestal, having a base end portion and a distal end portion mounting instrument packages and the like, a load transmitting leg coaxially aligned with the pedestal adapted to extend into load bearing engagement with a support surface, and a plurality of uniformly spaced stabilizing legs pivotally connected to the pedestal, at its base end portion, adapted to be extended from a stowed configuration wherein the legs are extended in substantial parallelism with the axis of the pedestal, into a pedestal stabilizing configuration wherein the legs are extended substantially radially from the pedestal for engaging the support surface, and a clamp for securing the stabilizing legs in their stabilizing configurations.

5 Claims, 6 Drawing Figures

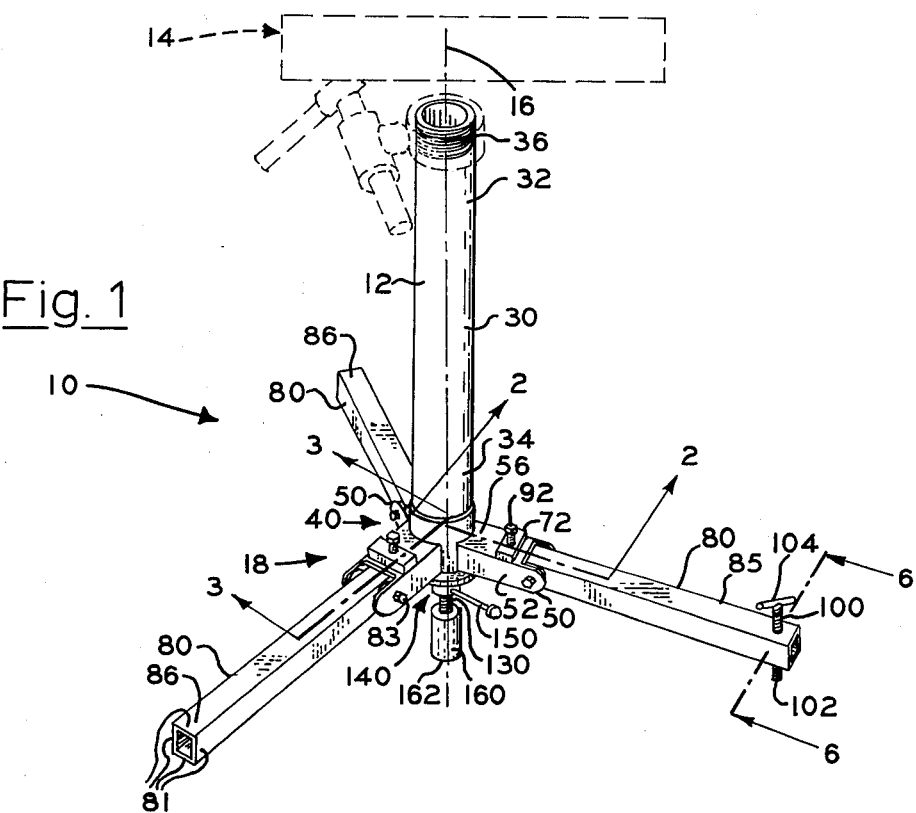
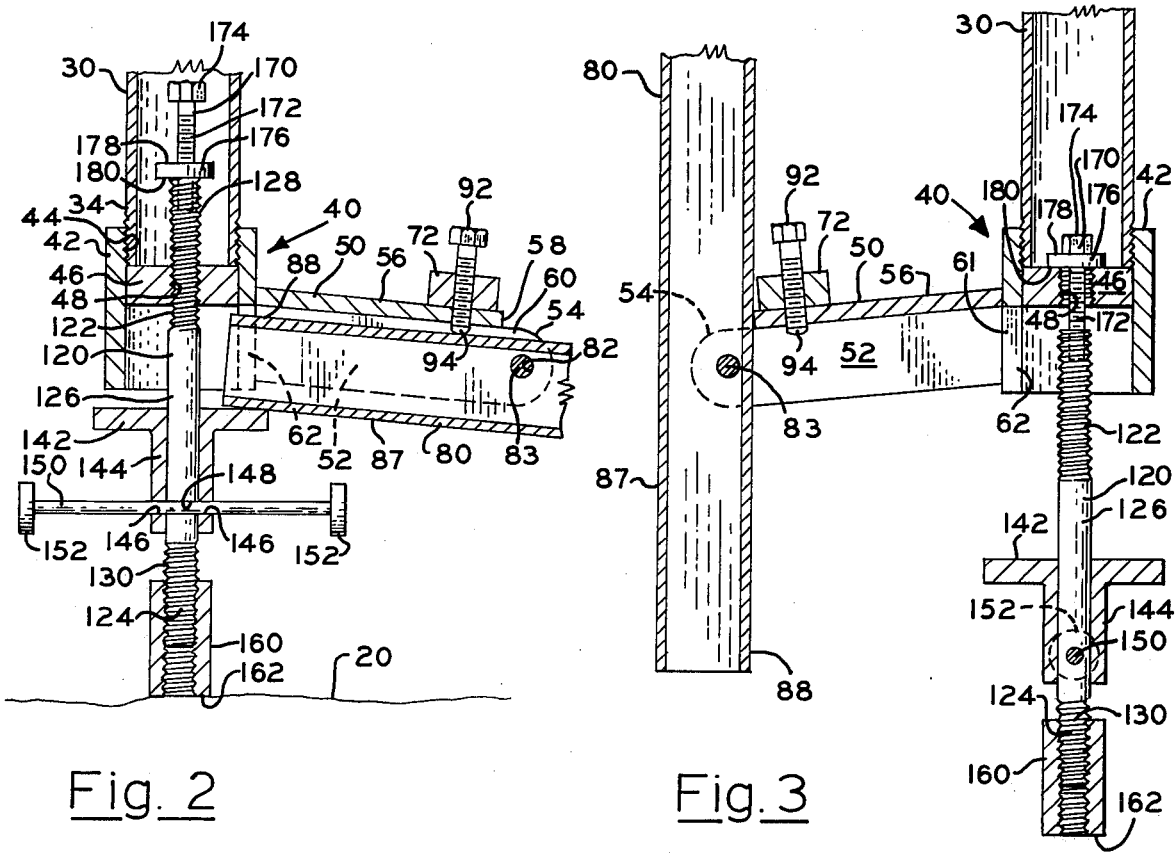

MOUNT

BACKGROUND OF THE INVENTION

1. Field of the Invention

The present invention relates to an improved mount, and more particularly to a portable quadropod mount of relatively light-weight construction and of a compact configuration particularly suited for use in supporting instrument packages and the like in a rigidly stabilized condition. 2. Description of the Prior Art Mounts which fold into stowed configurations for facilitating a transporting thereof, such as tripods for cameras and the like, have been in use for many years. However, such devices are necessarily relatively bulky and heavy, particularly if great stability is required, or if an instrument package to be supported thereby is relatively heavy. The bulk and weight of such devices result from the fact that the weight of a package of an excessive mass tends to impose excessive bending stresses on the legs and/or other members of the mount. While it has been suggested that stresses in the legs may be reduced by bringing the legs closer together, the necessary consequence of such a solution is a reduction in the relative stability of the mount.

The difficulties in achieving stability without attendant unreasonable weight and bulk characteristics are particularly severe in cases where the mount is to be employed in supporting portable astronomical telescopes of the larger sizes, which as a matter of fact, may weigh several hundred pounds and yet require extreme stability because of the magnification of the telescope.

The problems of providing a suitable mount for such instruments are further complicated by the fact that such mounts often must be set up in darkness and, often, on an uneven support surface. Furthermore, it is highly desirable that such mounts be of light weight construction and convenient to carry since frequently they must be transported considerable distances up mountain trails and the like. All of these problems are even further complicated by the desirability of adapting the mount to fold into a configuration suitable for stowage in the trunk of an automobile or the like. Finally, it is essential that any such mount be sufficiently rugged to withstand rough treatment by those who are primarily interested in protecting the instrument to be mounted rather than in caring for the mount itself.

OBJECT AND SUMMARY OF THE INVENTION

Accordingly it is an object of the present invention to provide an improved mount for instrument packages which is extremely stable and highly portable.

Another object is to provide a mount which is of relatively light weight construction.

Another object is to provide such a mount which is readily adapted for use on uneven support surfaces.

Another object is to provide a portable mount which can assume a compact configuration for stowage.

Another object is to provide such a mount which is simple to erect in darkness.

Another object is to provide improved elements and arrangements thereof in a mount of the type described which are economical, durable, and fully effective in accomplishing intended purposes.

Still further objects and advantages of the present invention will become apparent upon reference to the following description and accompanying drawings.

BRIEF DESCRIPTION OF THE DRAWINGS

FIG. 1 is a perspective view depicting a quadropod mount embodying the principles of the present invention erected in a load supporting configuration having an instrument package mounted thereon, as indicated in dash lines.

FIG. 2 is a fragmentary vertical section, on an enlarged scale, taken generally along line 2—2 of FIG. 1, showing a spider and the relation of elements associated therewith when the mount is in its load supporting configuration.

FIG. 3 is a fragmentary vertical section on an enlarged scale taken on line 3—3 of FIG. 1, showing the spider and the relation of elements associated therewith when the mount is in its transporting configuration.

DESCRIPTION OF THE PREFERRED EMBODIMENT

Figure 4:
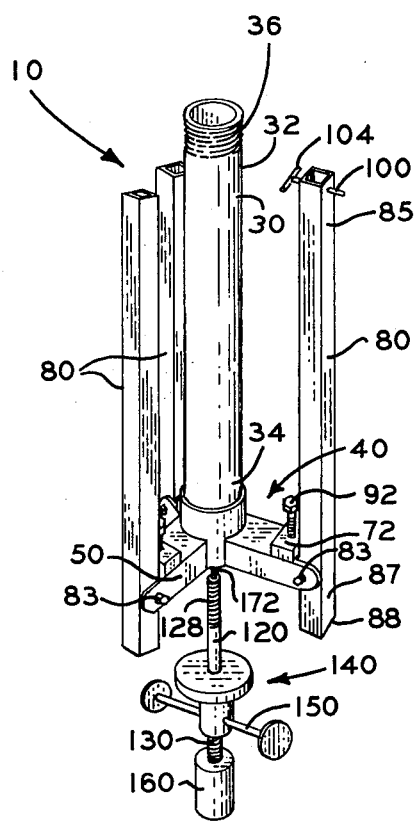
FIG. 4 is a perspective view of the mount of FIG. 1 in its transporting configuration.

Referring more particularly to the drawings, there is shown in FIG. 1 a quadropod mount which embodies the principles of the present invention, generally designated 10, shown set up in a load supporting configuration. The mount includes a load bearing pedestal 12 having mounted thereon an instrument package 14, indicated by dash lines in FIG. 1. The load is directed along a load axis 16 downwardly through the base portion 18 of the body 12 as the mount rests upon a support surface 20.

As best shown in FIG. 1, the pedestal 12 of the mount 10 includes an elongated tubular member 30 having a mounting end portion 32, and a base end portion 34. The mounting end portion of the pedestal receives the instrument package 14 in any convenient manner, such as by screw threads 36 or the like.

As best shown in FIGS. 2 and 3, a spider 40 is screw threadably mounted on the base end portion 34 of the tubular member 30. It is to be understood that the spider may be mounted on the pedestal by any suitable means, such as by welding, or the like. As shown in FIG. 2, the spider 40 has a sleeve 42 substantially coaxially related to the load axis 16 and includes female threads 44 upwardly disposed therein for receiving the base end 34 of the member 30. A disc shaped plug 46 disposed substantially coaxial with the load axis 16 is fixed, as by welding, or the like, within the sleeve 42 adjacent to the base end of the member 30. The plug has a bore, not designated, which is provided with a female screw thread 48 extending therethrough in a coaxial relationship with the load axis 16.

The spider 40 includes a plurality of uniformly spaced arms 50 affixed to the sleeve 42, as by welding or the like, extended in an inclined relationship with the axis 16.

Each of the arms 50, in turn, includes a pair of substantially vertical sidewalls 52 disposed in parallel spaced relation fixed to the sleeve 42, and terminates at outer terminal ends, designated 54.

Each of the arms 50 further includes a planar web 56 extended between and fixed to the sidewalls 52. The web 56 also is fixed to and extends outwardly from the sleeve 42 and terminates in an outward end portion 58 disposed inwardly of the terminal ends 54 of the side walls. The outward end portion 58 of the web 56, together with the inward surfaces of the sidewalls 52 define a space 60 while the downward surface of the web 56 of each of the arms 50, collectively with a relief 61 formed in the sleeve 42 defines a receiver 62 extended through the lower portion of the circumference of the sleeve. The purpose of the receiver 62 will hereinafter become more readily apparent. A pair of coaxially aligned bores 64 are positioned in the outer ends 54 of the sidewalls 52 of each arm 50, the axes of which are coincident with a horizontal pivotal axis 70. A threaded block 72 is fixed, as by welding, on the web 56 of each arm 50 near the outward end 58, thereof. It is to be understood that, although the spider of the present embodiment is assembled by welding, the spider may be assembled in any other suitable manner such as by casting or the like.

Each of the arms 50 of the spider 40 has connected thereto an elongated tubular stabilizing leg 80, having planar sides 81, mounted between the sidewalls 52 of said arm for pivotal movement about the axis 70 thereof. As best shown in FIG. 5, each stabilizing leg is mounted with an opposite pair of the sides 81 substantially parallel with and centrally disposed between the sidewalls of an arm 50. The opposite sides 81 include individual bores 82 aligned with the pair of aligned bores 64 formed in the sidewall 52 of the arm 50. A pivot pin 83 is extended through the aligned bores 64 and 82 in a manner such that the axis thereof is coincident with the axis 70. The stabilizing legs can be pivoted about their respective axes 70 into a stablizing position as shown in FIGS. 1 and 2, in which the outward portion, designated 85, of each leg is disposed radially outward of its respective pivotal axis 70, in substantial extension of its respective arm 50, and terminates in an outward end 86 disposed in adjacent relation to the support surface. In its stabilizing position, an inward portion 87 of each leg extends radially inward of its respective pivotal axis and is received in the receiver 62 and terminates in an inward end portion 88 positioned closely adjacent to the load axis 16, beneath the sleeve 42. The inward portions 87 of the stablizing legs 80 are shorter than the outward portions 85 thereof. The legs can also be pivoted about the axis 70 into a transporting position, best shown in FIGS. 3 and 4, in which the legs are arranged in substantial parallelism with the axis of the pedestal 12.

Each arm 50 also is provided with a wear take-up bolt 92 extending substantially perpendicular through a bore formed in the web 56 of the arm and screw threadably engages the block 72 for axial movement relative toward and away from the respective stabilizing leg 80 when it is in its stabilizing position. The wear take-up bolt 92 has a bearing surface 94 disposed toward and adapted to engage the stabilizing leg.

Figure 6:
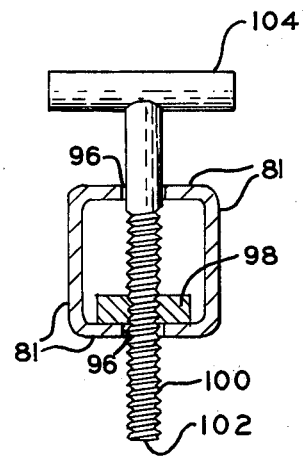
FIG. 6 is a fragmentary vertical section taken along line 6—6 of FIG. 1, showing the mounting of a jackscrew to a leg of the mount.

As seen in FIGS. 1 and 6, the outward portion 85 of a stabilizing leg 80 has, toward the end 86 thereof, a pair of aligned bores 96 formed in opposed sides 81 of the leg which are upwardly and downwardly disposed when the leg is in the stabilizing position. A nut 98 is fixed, as be welding, within the leg concentric with the bores 96. A jackscrew 100 screw threadably engages the nut 98 for axial movement relative thereto. The jackscrew has a pad or contact end 102 adapted to engage the support surface 20 when the stabilizing leg 80 is in its stabilizing position. A tee handle 104 is fixed to the jackscrew at the end thereof opposite said contract end 102. Although only one of the stabilizing legs 80 is provided with a jackscrew, as shown, it is to be understood that any number, or all, of the legs are adapted to receive a similar jackscrew where so desired.

As shown in FIG. 5, each pivot pin 83 is fitted through the aligned bores 64 and 82 and is secured in place by a nut 112. Each stabilizing leg 80 is centrally maintained between the sidewalls 52 of its respective arm 50 by a pair of washers 114.

As best shown in FIG. 2, a load transfer rod 120 is extended, from the tubular member 30, substantially coaxially with the axis 16, and has a threaded end portion 122 disposed toward the tubular member 30, a threaded opposite support end portion 124, and a cylindrical mid portion 126. Male screw theads 128 extend about the pedestal end portion of said rod while male screw threads 130 extend along the support end portion 124 of the rod.

The load transfer rod 120 is adapted to be disposed in a clamping position in which the male screw threads 128 are engaged with the screw threads 48 of the plug 46, provided for the spider 40, whereby axial movement relative to the plug is facilitated. When disposed in its clamping position, the mid portion and the support end portions of the load transfer rod 120 extend from the plug 46 toward the support surface 20 and is disposed between the inward ends 88 of the stabilizing legs 80.

A clamp assembly 140 is fitted to the mid portion 126 of the load transfer rod 120. The assembly 140 includes a circular, washer-like plate 142 extending circumferentially from the rod, somewhat outwardly of the sleeve 42 of the spider 40. The plate 142 is provided with an annular surface adapted to engage the inward ends of the stabilizing legs 80 as the plate is advanced toward the spider 40 in response to axial motion imparted to the load transfer rod 120.

The clamp assembly 140 also has a sleeve 144 fitted about the load transfer rod, fixed to the plate 142, and extending therefrom toward the support end portion 124 of the load transfer rod. This sleeve has a pair of transversely aligned bores 146 which are, in turn, aligned with a corresponding transverse bore 148 formed in the mid portion of the load transfer rod. A handle rod 150 is slidably fitted through the corresponding bores 146 and 148, respectively, formed in the sleeve 144 of the assembly 140 and in the load transfer rod 120. The handle rod 150 extends transversely on either side of the said sleeve 144 and is retained in the bores 146 and 148 by knobs 152 provided at opposite ends of the handle rod. The handle rod is employed in torquing the load transfer rod as well as to secure the clamp assembly to the load transfer rod. It is to be understood that the plate 142 and sleeve 144 can be secured to the load transfer rod by any suitable means.

A sleeve-like foot 160 screw threadably engages the male screw threads 130 on the support end portion 124 of the load transfer rod 120. The foot 160 is supported for axial movement relative to the load transfer rod as the foot is rotated by finger pressure. The foot has a sole surface 162 adapted to engage the support surface 20.

A retainer assembly 170, FIGS. 2 and 3, is provided for assuring a coupled relation is maintained between the pedestal and the load transfer rod. The retainer assembly 170 includes a shank 172 of smaller diameter than the end portion 122 of the load transfer rod 120 and is fixed to said pedestal end portion thereof, in substantially coaxial relation therewith, and extends to a head 174 of substantially larger diameter than the shank. A washer 176, having annular surfaces 178 and 180 substantially larger in diameter than the female screw threads 44 formed in the plug 46 of the spider 40, is loosely fitted about the shank 172. The washer 176 is adapted to engage, simultaneously, the head 174 of the retainer, at the surface 178 and to engage the plug 46 at the surface 180, FIG. 3.

Figure 5:
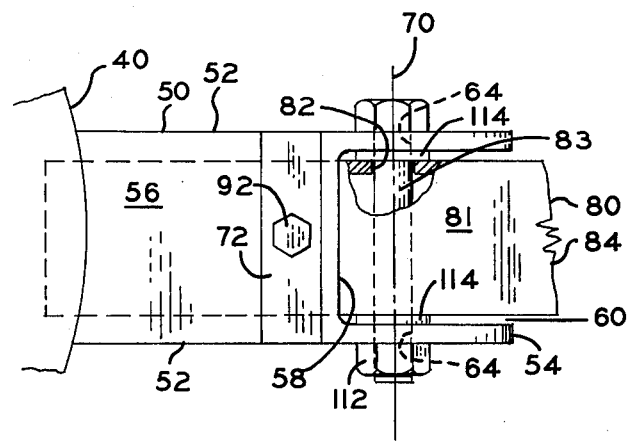
FIG. 5 is a fragmentary top view of the mount of FIG. 1 with a section broken away showing a pivotal coupling.

The load transfer rod 120 is adapted to be disengaged from the screw threads 44 of the plug 46, through axial displacement, allowing the load transfer rod, together with the clamp assembly 140, foot 160, and retainer 170 connected thereto, to assume a released position, shown in FIGS. 3 and 4. In the released position the surface 180 of the washer 176 of the retainer assembly 170 engages the plug 46, and the surface 178 of the washer engages the head 174 of the retainer assembly 170, so that the load transfer rod 120 and elements connected therewith are coupled to the spider 40 by tension of the shank 172.

OPERATION

The operation of the preferred embodiment of the present invention is believed to be clearly apparent and is briefly summarized at this point.

The quadropod mount 10 is transported to the site where it is to be used in a relatively compact configuration, depicted in FIGS. 2 and 4, in which the stabilizing legs 80 are pivoted into a transporting position, in substantial parallelism with the elongated tubular member 30. When manually carrying the mount to a site where it is to be used, it will be found convenient to carry the mount in a position inverted from that shown in FIG. 4. In such an inverted position the greater weight of the longer outward portions 85 of the stabilizing legs 80 will gravitationally urge the outward portions into substantial parallelism with the tubular member so that the mount will present a convenient configuration for transportation.

During transporation of the mount, the load transfer rod 120 and the clamp assembly 140, the retainer 170, and the foot 160, may be in either their clamping position, shown in FIG. 2, in which the male screw threads 128 on the threaded end portion 122 of the load transmitting rod engages the female screw threads 48 in the plug 46 of the spider 40, or in their released position shown in FIG. 3. In the released position the load transfer rod 120 and elements connected thereto are securely retained to the other elements of the mount, as previously described, by the engagement of the washer 176 of the retainer with the plug 46 of the spider. The handle rod 150 is slidably fitted through the load transfer rod and can be slid transversely therein to any convenient carrying position, whether the load transfer rod is in the clamping position or the released position. Since the knobs 152 retain the handle rod to the other elements of the mount, and since the retainer 170 prevents the load transfer rod and elements connected thereto from becoming disaasociated from the other elements of the mount, the quadropod mount may be stowed or carried as a unit.

When the quadropod mount 10 has been transported to the site where it is to be used, the mount is set up for use. The initial set up operation is performed with the mount in an inverted position with the mount being supported by, first, resting the mounting end portion 32 of the member 30 on the support surface 20. Next, the load transfer rod 120 is placed in the released position if it is not already in this position. Then, the stabilizing legs 80 are pivoted about their respective pivotal axes into the stabilizing position in which the inward portions 87 of said legs extend into the receiver 62. Since the clamp assembly 140 can be moved away from the spider to a distance determined by the length of the shank 172 of the retainer 170, the pivoting of the legs into their stabilizing positon is facilitated by lack of interference by said clamp assembly. The male screw threads 128 on the threaded end portion 122 of the load transmitting rod are then engaged with the female screw threads 48 in the plug 46 of the spider 40, and the load transmitting rod is rotated so as to bring the plate 142 of the clamp into engagement with the inward ends 88 of the stabilizing legs 80, as shown in FIG. 2. The stabilizing legs are then clamped in their stabilizing position by tightening the plate 142 against the inward ends of the legs. This tightening is facilitated by sliding the handle rod so that one of the knobs 152 is adjacent to the sleeve 144 of the clamp and the handle has a maximum extension on one side of said sleeve for relatively greater leverage in applying torque to the load transmitting rod.

When the legs 80 are clamped in their stabilizing position the mount 10 is placed in an upright position as shown in FIG. 1. Wear and necessary manufacturing clearances of the pivot pins 83 and/or the bores 86 and 64 tend to allow relative motion of the spider and the stabilizing legs thus permitting vibration of the instrument package to occur. Undesirable relative motion can be prevented by rotating the wear take up bolts 92, which screw threadably engage the blocks 72 on the outward ends of the web 56 of the arms 50, until the ends 94 of the bolts securely engage their respective stabilizing legs. When the load transfer rod 120 is in the clamping position and the mount 10 is set up for use, as shown in FIG. 2, the loosely fitted washer 176 of the retainer 170 is gravitationally urged downward into engagement with the pedestal end portion 122 of the load transmitting rod.

When the stabilizing legs 80 are clamped in their stabilizing position and the mount 10 is positioned on the support surface 20 at the site in which it is to be used, the sleevelike foot 160 is torqued and thus extended toward the support surface by suitable rotation of the foot 160. The foot is extended until the sole surface 162 thereof engages with the support surface so that substantially all of the vertical load applied along the load axis by the instrument package 14 is transmited to the support surface through the load transfer rod 120. The stabilizing legs 80 now become operable to stabilize the mount and the instrument package mounted thereto. The jack screw 100 provided at the outward end 86 of a stabilizing leg 80 facilititates placing the member 30 in a position substantially perpendicular to the support surface 20 so that the load will be directed substantially coaxially through the spider to the load transfer rod and thence to the support surface even though the surface is relatively rough or uneven. The jack screw is, of course, extended by rotation in its screw threaded engagement with the nut 98 so that the contact end 102 thereof engages the support surface. This rotation is facilitated by the tee handle 104 fixed to the jack screw.

After the quadropod mount 10 has been set up, the instrument package 14 is attached thereto by the screw threads 36 provided on the mounting end portion 32 of the member 30.

It should be apparent that transportation, set-up, and take-down of the mount, especially in darkness, is facilitated by the simple construction of the mount.

Although the invention has been herein shown and described in what is conceived to be the most practical and preferred embodiment, it is recongized that departures may be made therefrom within the scope of the invention, which is not to be limited to the illustrative details disclosed.

Having described my invention, what I claim as new and desire to secure by Letters Patent is:

1. A mount for a load directed toward a support surface along a load axis extending substantially perpendicular to said surface, comprising:
   A. a pedestal characterized by a centrally disposed load axis, a mounting portion adapted to receive an instrument package, and a base portion adapted to be disposed in juxtaposition with a support surface;
   B. a plurality of uniformly spaced stabilizing legs pivotally connected to the base portion of the pedestal and extending radially therefrom for engaging the support surface; and
   C. a load transfer member mounted on the base portion of the pedestal and extended coaxially therefrom for bearing against the support surface comprising a foot for engaging the support surface, means for interconnecting the foot in a load transferring, spatial relationship with the base portion of the pedestal including clamping means for securing the legs in a stabilizing position in which the legs extend in angular relation with said load axis, means for varying said spatial relationship, and securing means for maintaining the foot in said spatial relationship with the base portion of the pedestal.

2. A mount comprising:
   A. a tubular pedestal adapted to extend substantially perpendicular to a support surface for bearing a load directed substantially axially of the pedestal toward the support surface, having a mounting portion adapted to receive a given package and a base portion adapted to be disposed in spaced relation with the support surface;
   B. a spider mounted on the base end of the pedestal having a central sleeve fitted to said base end and a plurality of arms extending outwardly from the sleeve including a plurality of pivotal couplings disposed at the outermost ends thereof having pivotal axes substantially mutually perpendicular to the longitudinal axis of the tubular pedestal and to the directions of extension of the respective arms;
   C. a plurality of elongated stabilizing legs, each being connected by a pivotal coupling to one of the radially extending arms and adapted to assume a transporting position in which the leg is extended from the pivot coupling in substantial parallelism with the tubular pedestal and a stabilizing position wherein the leg extends radially outwardly toward the support surface;
   D. a load transmitting rod extended in substantially coaxial relation with the tubular pedestal having male screw threads extended along the opposite end portions thereof, having a pedestal end portion screw threadably mounted in the spider for relative axial movement with respect thereto and extended axially into the tubular pedestal, a central portion extending between the adjacent inner ends of the stabilizing legs when said legs are in the stabilizing position, and an opposite support end portion extending beyond said inner ends of the stabilizing legs toward the support surface;
   E. a foot having a sole surface adapted to engage the support surface screw threadably mounted on the support end portion of the load transmitting rod for axial movement along a path extending toward the support surface beyond the support end portion of said load transmitting rod; and
   F. a clamp including a plate fixed to the central portion of the load transmitting rod adapted to engage said inner end of said legs when the legs are in their stabilizing position, and a handle rod extended transversely through the load transmitting rod for applying torque to said rod.

3. The mount of claim 2 further comprisng a retainer mounted on the pedestal end portion of the load transmitting rod substantially coaxially therewith and extended into the tubular pedestal, for maintaining a connected relationship between said rod and said pedestal including a shank portion adjoining the load transmitting rod substantially smaller in diameter than said rod and a head substantially larger in diameter than said rod disposed in a spatial relationship therewith.

4. The mount of claim 2 having a jack screw which is screw threadably mounted to a stabilizing leg near the outer end portion thereof for axial movement toward and away from the support surface when the leg assumes the stabilizing position including a pad adapted to engage the support surface when the leg assumes the stabilizing position.

5. The mount of claim 2 in which a plurality of wear take-up bolts are individually screw threadably mounted on the radially extending arms of the spider inward of and adjacent to the pivotal couplings, each being extended axially through a corresponding arm toward a stabilizing leg for movement toward and away from the leg having an end adapted to engage a portion of the leg placed from the support surface when the leg assumes the stabilizing position.

* * * * *

UNITED STATES PATENT AND TRADEMARK OFFICE
CERTIFICATE OF CORRECTION

PATENT NO. : 4,061,302
DATED : December 6, 1977
INVENTOR(S) : Terry Boone

It is certified that error appears in the above-identified patent and that said Letters Patent are hereby corrected as shown below:

Column 1, line 11, delete "2. Description of the Prior Art".

Column 1, between lines 11 and 12, insert ---2. Description of the Prior Art:---.

Column 4, line 1, delete "contract" and substitute ---contact---.

Column 5, line 45, delete "engages" and substitute ---engage---.

Column 6, line 50, delete "transmited" and substitute ---transmitted---.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks